United States Patent [19]

Kandachi

[11] Patent Number: 5,010,042

[45] Date of Patent: Apr. 23, 1991

[54] SINTERED GLASS BODY WITH OPAQUELY MOTTLED PATTERN AND METHOD OF PRODUCING SAME

[75] Inventor: Takayoshi Kandachi, Osaka, Japan

[73] Assignee: Central Glass Company, Limited, Ube, Japan

[21] Appl. No.: 288,965

[22] Filed: Dec. 23, 1988

[30] Foreign Application Priority Data

Dec. 26, 1987 [JP] Japan .................. 62-331335

[51] Int. Cl.$^5$ .................................. C03C 1/06
[52] U.S. Cl. ............................ 501/32; 501/17; 501/18
[58] Field of Search .................... 501/17, 18, 32

[56] References Cited

U.S. PATENT DOCUMENTS 4,331,768 5/1982 Boyd et al. .
4,818,731 4/1989 Mizutani et al. .............. 501/17

FOREIGN PATENT DOCUMENTS 55-29018 7/1980 Japan .
60-151251 8/1985 Japan .

*Primary Examiner*—Mark L. Bell
*Assistant Examiner*—Deborah Jones

*Attorney, Agent, or Firm*—Fleit, Jacobson, Cohn, Price, Holman & Stern

[57] ABSTRACT

The invention relates to a substantially foamless sintered glass body with a decorative pattern. The glass body is made of a glass and a powder of at least one heat-resistant inorganic oxide, e.g. aluminum oxide, which is colorless or assumes a whitish color and has a refractive index different from that of the glass by at least 15%, and the glass body contains an inorganic pigment. The oxide powder amounts to 0.2-10 wt % of the glass. The glass body has, in its surfaces and sections, opaline or opaque and palely colored mottles bordered by less opaque and relatively deeply colored regions. The glass body is produced by compressively granulating a powder mixture of the glass, inorganic oxide(s) and pigment into granules not smaller than 1 mm, integrating the granules, firing the integrated granules at a temperature ranging from the softening point to the fluid point of the glass and applying a pressure to the fired material during or immediately after firing. The mottle size in the sintered glass body depends on the granule size of the fired material, and opaqueness of the mottles is attributed to the light diffusing effect of the oxide powder.

7 Claims, No Drawings

SINTERED GLASS BODY WITH OPAQUELY MOTTLED PATTERN AND METHOD OF PRODUCING SAME

BACKGROUND OF THE INVENTION

This invention relates to a sintered glass body which has an opaquely mottled pattern and presents the appearance of a natural rock and, hence, is useful as a decorative building material. The opaqueness is attributed to an oxide powder dispersed in the sintered glass body.

There are some kinds of glass or semi-glass bodies with decorative patterns. For example, JP 55-29018 shows glass-ceramics articles with a marble-like pattern produced by integrating small granules of a glass from which needle-like crystals can be precipitated and heating the integrated granules at a temperature suited to crystallization. However, this technique is not convenient for industrial applications firstly because the type of the crystallizable glass is strictly limited and also because the crystallizing heat treatment requires a very high temperature and strict control of the heating and cooling conditions.

JP-A 60-151251 shows, as a synthetic rock, a foam glass body having a large number of island-like regions scattered in a finely foamed glass matrix which is different in color from the island-like regions. The island-like regions too have fine pores and hence exhibit a light diffusing effect. The foam glass body is produced by firing a mixture of a glass powder containing a pigment and a granulated glass material of the island-like regions. However, in a foam glass of this type it is inevitable that open pores exist in the surfaces as a cause of stains by depositon of dust and susceptibility to scratches. Besides, glass bodies high in porosity are often insufficient in flexural and compressive strengths.

SUMMARY OF THE INVENTION

It is an object of the present invention to provide a substantially foamless glass body with an opaquely mottled pattern suited for decorative purposes, which glass body can industrially be produced easily and at relatively low costs.

It is another object of the invention to provide a method of producing a patterned glass body according to the invention.

The present invention provides a substantially foamless sintered glass body, which is formed of a glass and at least one heat-resistant inorganic oxide, which is colorless or assumes whitish color and has a refractive index different from the refractive index of the glass by at least 15%, and contains an inorganic pigment. The total amount of the inorganic oxide(s) is from 0.2 to 10 parts by weight per 100 parts by weight of the glass powder. The glass body has, in its surfaces and sections, opaque mottles bordered by less opaque and relatively deeply colored regions.

For producing a sintered glass body with a mottled pattern as stated above, the invention provides a method comprising the steps of preparing a mixture of 100 parts by weight of a powder of a glass, 0.2 to 10 parts by weight of a powder of at least one heat-resistant inorganic oxide, which is colorless or assumes a whitish color and has a refractive index different from the refractive index of the glass by at least 15%, and an inorganic pigment except when the glass contains the pigment, compressively granulating the mixture into granules not smaller than 1 mm in granule size, integrating the granules, firing the integrated granules at a temperature in the range from the softening point of the glass to the fluid point of the glass and applying a pressure to the fired material during or immediately after firing.

In a sintered glass body according to the invention the opaque mottles are attributed to a light diffusing effect of the inorganic oxide(s) dispersed in powder form and granulation of the mixture of the raw materials. The size of each mottle depends on the granule size of the granulated material.

The amount of the inorganic pigment is variable. In a sintered glass body produced by using a very small amount of pigment, the opaque mottles are milk-white or opaline and are bordered by less opaque and relatively deeply colored regions. When the amount of the pigment is slightly increased, the mottles in the sintered glass body opaquely and palely assumes the color of the pigment and are bordered by less opaque and more deeply colored regions. By further and adequately increasing the amount of the pigment it is possible to obtain a sintered glass body with opaque and relatively deeply colored mottles bordered by less opaque and more deeply colored regions.

A sintered glass body according to the invention, with an opaquely mottled pattern as mentioned above, has an elegant appearance and gives the appearance of a natural rock and, hence, is high in decorative effect. This glass body has a dense and substantially poreless structure and hence is high in mechanical strength and low in susceptibility to surface scratches or flaws. Furthermore, this glass body is high in heat resistance because of containing fine particles of heat-resistant inorganic oxide(s). Therefore a sintered glass body according to the invention is of high value as a decorative building material which can be produced relatively easily and at relatively low costs. It is also possible to use the present invention as a surface layer provided to a conventional glass or ceramic plate, in particular a foamed glass plate. For such a purpose it is possible to produce a unitarily multilayer glass plate by layering the granulated material according to the invention on a layer of the material of, for example, a foam glass and firing the materials in layers.

DESCRIPTION OF THE PREFERRED EMBODIMENTS

In this invention the type of the glass as the principal material is not limited. It is favorable to use an ordinary clear glass which is inexpensive and easily available as an industrial material, and such a glass can be selected from, for example, alkali lime glass, boro-silicate glass and aluminosilicate glass. These glasses have refractive indices of about 1.5. In any case the glass is used in the form of a powder not larger than 200 $\mu$m in particle size. In this invention it is necessary to closely disperse an oxide powder in the glass powder. If a coarser glass powder is used, it is likely that in the sintered glass body the light diffusing effect of the oxide powder becomes uneven.

The second material is a heat-resistant inorganic oxide which is colorless or assumes a white color and has a refractive index considerably different from that of the employed glass. Furthermore, the inorganic oxide is required not to act as a foaming agent and not to make interdiffusion with the glass at temperatures ranging from the softening point of the glass and the fluid point of the glass (a temperature at which the viscosity of the glass lowers to $10^5$ poises). Either a natural mineral or a synthesized compound may be used with consideration of availability and cost. Preferred examples of useful oxides are corundum ($Al_2O_3$), zircon ($ZrO_2.SiO_2$), rutile ($TiO_2$), baddeleyite ($ZrO_2$), spinel ($MgO.Al_2O_3$), cassiterite ($SnO_2$) and zinc oxide (ZnO). These oxides have refractive indices greater than 1.73. It is possible to use two or more kinds of oxides jointly.

To obtain a sufficiently opaque glass body, it is necessary that the refractive index of the employed oxide differs from that of the glass by at least 15%. More definitely, it is preferred that the ratio of the refractive index of the oxide to the refractive index of the glass is greater than 1.15 inclusive, or is smaller than 0.87 inclusive.

In every case the oxide is used in the form of a powder not larger than 200 μm in particle size. Use of a coarser oxide powder will result in unevenness of the light diffusing effect of the oxide in the sintered glass body.

The amount of the oxide powder is limited within the range from 0.2 to 10 parts by weight per 100 parts by weight of the glass powder. If the amount of the oxide is less than 0.2 part the sintered glass body is insufficient in opaqueness. If the amount of the oxide exceeds 10 parts the obtained glass body will be insufficient in the degree of sintering or denseness and will have considerable pores.

The third material is an inorganic pigment which can be dissolved in glass or can uniformly and finely (on the order of micrometer) be dispersed in glass. A pigment of any color may be used according to the desired color tone of the glass body, though a white pigment is rarely used in this invention. A wide selection can be made from metals, metal oxides and other kinds of metal salts. In the case of preparing a glass powder for use as the principal material with a steel mill it is natural that a very small amount of Fe intrudes into the glass powder, and in this case it is possible to use that Fe as the sole pigment for producing a glass body according to the invention. Usually a pigment is added, together with a colorless or white oxide powder, to a separately prepared glass powder, but it is also possible to introduce a pigment into the glass to be pulverized into a glass powder.

The amount of the pigment is arbitrary, and an optimum amount depends on the kind of pigment and the desired color tone of the glass body to be produced. In the case of producing a glass body having opaline or opaque and palely colored mottles bordered by more deeply colored and less opaque regions, a relatively small amount of pigment is used. That is, in general it suffices to use less than 0.5 part by weight of pigment per 100 parts by weight of glass powder. For example, when the pigment is Fe a suitable amount of Fe is from 0.02 to 0.2 part by weight per 100 parts by weight of glass powder. If the amount of Fe is less than 0.02 part the sintered glass body is entirely pale in color so that an attractive pattern of mottles can hardly be seen. If the amount of Fe exceeds 0.2 part the glass body has colored mottles against the desire for milk-white mottles.

When an appropriately small amount of pigment is used, a glass body produced by the method according to the invention has opaline or opaque and very palely colored mottles bordered by more clearly and deeply colored and less opaque regions. The mechanism of such an uneven effect of the pigment has not fully been elucidated. Presumably, firing of an integration of the granulated material causes a portion of the fluidized glass to exude out of the granules into the interstices between the granules to form glass-rich regions, and such glass-rich regions are deeply colored since the pigment is dissolved or dispersed in the glass rather than in the oxide powder. Also presumably, the unevenness of coloration is attributed to slight porosity of the obtained glass body. Even a substantially foamless glass body of this invention has a very small number of tiny pores, and such pores exist almost exclusively in the mottle regions to occupy about 0.1 vol % of the mottle regions. In the other regions where porosity is nearly zero, diffusion of light is not so significant, whereby a clearly colored appearance is given.

To produce a glass body according to the invention with opaque and colored mottles, the amount of pigment is increased according to the desired degree of deepness of the color of the mottles. In general it is needed to use more than 0.2 part by weight of pigment per 100 parts by weight of glass powder. Also in this case the mottles in the sintered glass body are bordered by more deeply colored and less light-diffusing regions.

After preparing a mixture of a glass powder and at least one heat resistant inorganic oxide powder and an inorganic pigment except when the glass itself contains a pigment, the mixture is granulated by using a compressive method. If necessary a small amount of water is added as a binder to the powder mixture. In this invention it is undesirable to use a binder that causes foaming at the subsequent firing of the granuated material, such as water glass or an organic binder. In granulation, the powder mixture must be compressed by application of a pressure of at least 100 kg/cm$^2$. For example, the powder mixture is granulated with a tabletting machine, or the powder mixture moistened with water is first rolled into a sheet and the sheet is crushed into granules of suitable size. The granule size is determined according to the desired size of the mottles in the sintered glass body. If the granule size is smaller than 1 mm it is difficult to obtain a sintered glass body with well perceptible mottles.

The granules of the mixed raw materials are integrated by a suitable method such as packing in a molding box or sandwiching between a pair of vertically spaced metal plates. The granules in a suitably integrated state are fired in a furnace at a temperature in the range from the softening point of the employed glass to the fluid point of that glass. For example, in the case of using a soda lime glass the firing temperature is from about 700° C. to slightly below 1000° C. If the firing temperature is lower than the softening point of the glass the obtained glass body is insufficient in the degree of sintering and relatively high in porosity and, hence, is insufficient in mechanical strength and flaw resistance. If the firing temperature is above the fluid point of the glass, fluidization of the glass causes interdiffusion of not only the glass itself but also the heat-resistant oxide and the pigment between adjacent granules and also between the granules and the interstices and results in vagueness of opaque mottles and colored borders in the sintered glass body. Besides, excessive fluidization of the glass makes it difficult to release the sintered glass body from a metal member used to press the fired material in the below-described manner.

The granulated and integrated material is pressed during or immediately after firing for the purpose of keeping the granuels in tight contact with each other and almost completely dissipating gases thereby obtaining a sintered glass body having a dense and substantially foamless structure. When the granulated material is fired in a molding box, pressing of the fired material can be accomplished by loosely fitting a metal lid into the molding box so as to rest on the material packed in the molding box. When the granulated material is fired in a state sandwiched between a pair of metal plates, pressure is applied to the fired material by pressing each metal plates toward the opposite metal plate. For elimination of gas bubbles or foams in the fired material, it is preferable to heat the granulated and integrated material up to a temperature slightly below the fluid point of the glass and the gradually lower the temperature while applying a pressure to the fired material.

According to the invention it is possible to produce a glass body with a plurality of groups of opaque mottles which are irregularly distributed and are different in color from one another by firing a mixture of granulated materials containing different pigments. Also it is possible to produce a glass body having a plurality of groups of opaque mottles which are irregularly distributed and are similar in color but different in paleness or deepness of the color by firing a mixture of granulated materials containing different amounts of the same pigment. Alternatively, mottles similar in color but different in paleness or deepness of the color can be produced by granulating a single kind of powder mixture with application of various pressures to obtain granules different in bulk density and firing a mixture of such granules.

The invention is further illustrated by the following nonlimitative examples.

EXAMPLES 1-4

In every example, cullet of a colorless and transparent sheet glass was used as the principal raw material. The glass was a soda lime glass having a refractive index of 1.51.

The cullet was pulverized in a porcelain ball mill (in Examples 1 and 4) or a steel ball mill (in Examples 2 and 3) into fine particles. In Examples 1-3 the glass particles were smaller than 50 μm. In Example 4 the glass particles were smaller than 200 μm but were partly larger than 50 μm.

In every example, a powder of curundum having a refractive index of 1.77 was used as a light diffusing material. In Examples 1-3 the corundum powder was smaller than 10 μm in particle size. In Example 4 the corundum powder was 50-150 μm in particle size. As shown in Table 1, 0.25 to 10 parts by weight of corundum powder was used per 100 parts by weight of the glass powder.

As a pigment a powder of CoO was used in Example 1 and a powder mixture of $Fe_2O_3$ and $Cr_2O_3$ in Example 4. As shown in Table 1, the amount of the pigment was 0.05 to 0.7 part by weight per 100 parts by weight of the glass powder. In Examples 2 and 3, Fe was incorporated into the glass powder during pulverization in the steel ball mill. By dissolving the glass powder in an acid and analyzing the iron content in the solution, the content of Fe in the glass powder used in Examples 2 and 3 was determined to be 700 ppm (0.07 wt %). In Examples 2 and 3, the thus introduced Fe was used as a pigment without adding any extra pigment.

In every example, 2 parts by weight of water was mixed with 100 parts by weight of the mixture of the glass powder, corundum and pigment, and the moist mixture was granulated with application of pressure. In Examples 1, 3 and 4 the moist mixture was pressed into a sheet between a pair of rolls under a pressure of 1000 kg/cm², and the sheet was crushed between a pair of rolls provided with rotary blades. The crushed material was graded to use granules 1 to 3 mm in diameter. In Example 2 a tabletting machine was used to form the moist material into tablets having a diameter of 5 mm under a pressure of 3000 kg/cm².

In every example the granular material was packed in a rectangular mold, and a lid plate was loosely fitted into the mold so as to rest on the packed material to thereby apply a pressure to the packed material. In that state the mold was put into a furnace to fire the packed material at 790° C. for 40 min. The fired material was left natural cooling in the mold. As the result a sintered glass body was obtained.

The surfaces of the sintered glass body produced in every example was ground and polished to evaluate (1) recognizability and attractiveness of mottles appearing in the surfaces and (2) the degree of opalineness or opaqueness (light diffusiveness) by observation with the naked eye. For each of items (1) and (2) the samples were ranked in three grades: A (very good), B (tolerable) and C (not good). Furthermore, denseness of the sintered glass bodies was evaluated by microscopic observation of the amount of tiny foams in the mottle areas. The samples were ranked in the following three grades. A (very good): not more than 20 foams larger than 200 μm (inclusive) in diameter per cm² and not more than 100 foams smaller than 200 μm in diameter per cm². (In terms of porosity, not more than 0.3 vol %. Foams smaller than about 30 μm could not be detected.) B (tolerable): not more than 50 foams larger than 200 μm (inclusive) in diameter per cm² and not more than 50 foams smaller than 200 μm in diameter per cm², except the samples of rank A. (In terms of porosity, not more than 0.8 vol % but more than 0.3 vol %.) C (not good): other than samples of rank A and rank B. The results of evaluation are shown in Table 1.

COMPARATIVE EXAMPLES 1-5

As Comparative Examples 1-5, as shown in Table 1, the manufacturing process of Example 2 or 3 was partially and selectively modified only in respect of the particle size of the glass powder, the particle size and/or amount of the corundum powder and/or the content of Fe in the glass powder. Besides, in Comparative Example 5 the mixture of the glass powder containing Fe and the corundum powder was granulated by mixing 100 parts by weight of the powder mixture with 3 parts by weight of water glass (calculated as solid alkali silicate glass) and by using a pan-like granulator for tumbling granulation of the moist mixture into granules 1-3 mm in diameter. That is, in Comparative Example 5 the granulation was carried out without pressing the moist powder mixture.

The sintered glass bodies of Comparative Examples 1-5 too were evaluated on the above described criterions. The results were as shown in Table 1.

TABLE 1

| | Glass Powder (refractive index 1.51:100 parts by wt.) particle size (μm) | Oxide kind (refractive index) | Oxide particle size (μm) | Oxide amount (part by wt.) | Pigment kind | Pigment amount (part by wt.) | Granulating Method | Mottling | Opaqueness | Denseness |
|---|---|---|---|---|---|---|---|---|---|---|
| Ex. 1 | ≦50 | corundum (1.77) | ≦10 | 0.25 | CoO | 0.05 | press & crush | A | B | A |
| Ex. 2 | " | corundum (1.77) | " | 5 | Fe | 0.07 | tableting | A | A | A |
| Ex. 3 | " | corundum (1.77) | " | 10 | Fe | 0.07 | press & crush | A | A | B |
| Ex. 4 | ≦200 | corundum (1.77) | 50–150 | 10 | Fe₂O₃ / Cr₂O₃ | 0.7 | press & crush | A | A | A |
| Comp. Ex. 1 | ≦50 | corundum (1.77) | ≦10 | 0.15 | Fe | 0.07 | press & crush | B | C | A |
| Comp. Ex. 2 | " | corundum (1.77) | " | 15 | Fe | 0.07 | press & crush | A | A | C |
| Comp. Ex. 3 | ≦200 | corundum (1.77) | 200–300 | 10 | Fe | 0.06 | tableting | C | B | C |
| Comp. Ex. 4 | 200–900 | corundum (1.77) | 50–150 | 10 | Fe | 0.04 | " | B | C | C |
| Comp. Ex. 5 | ≦200 | corundum (1.77) | ≦10 | 5 | Fe | 0.07 | tumbling | B | A | C |

The sintered glass body of Example 4 gave the appearance of a natural black rock having opaque and dark gray mottles.

In Comparative Example 1 where the amount of the corundum powder was too small, the sintered glass body retained some transparency and was insufficient in mottling and opalineness. In Comparative Example 5 where the amount of the corundum powder was too large, the sintered glass body was insufficient in the degree of sintering and too high in porosity. In Comparative Example 3 where the corundum powder was too coarse and in Comparative Example 4 where the glass powder was too coarse, the sintered glass bodies were inferior or insufficient in mottling, uneven in opaqueness and too high in porosity. In Comparative Example 5 where the mixture of raw materials was granulated with a tumbling granulator, the sintered glass body contained considerable foams.

EXAMPLES 5–10

In these examples the principal raw material was the glass powder (smaller than 200 μm in particle size: refrative index of the glass was 1.51) used in Example 4.

In place of corundum used in the foregoing examples zircon (refractive index 1.97) was used in Examples 5 and 6, and cassiterite (refractive index 1.99), rutile (refractive index 2.7), spinel (refractive index 1.79) and baddeleyite (refractive index 2.2) were used in Examples 7 to 10, respectively. In every case the oxide was in fine powder form as can be seen in Table 2, and the proportion of the oxide to the glass powder was variable as shown in Table 2.

In Example 5 the pigment was Fe originated from the steel ball mill. In Examples 6–10 the glass was pulverized in the porcelain ball mill, and MnO₂, Fe₂O₃, FeSe, Al₂O₃/CoO mixture and CuO were used as pigment, respectively. The amount of the pigment was variable as shown in Table 2.

In every example 2 parts by weight of water was mixed with 100 parts by weight of the powder mixture of glass, oxide and pigment, and the moist mixture was granulated into granules 1–3 mm in diameter by the same method as in Example 1 using rolls. The granulated material was fired by the same method and under the same conditions as in Examples 1–4, and the sintered glass bodies were evaluated in respect of recognizability of mottles in the surfaces, degree of opaqueness and denseness on the same criterions as in Examples 1–4. The results are shown in Table 2.

COMPARATIVE EXAMPLES 6 AND 7

The manufacturing process of Example 5 was modified only in that, in place of the zircon powder, a powder of barium oxide (refractive index 1.98) and a powder of feldspar (refractive index 1.65) were used, respectively. The particulars are shown in Table 2.

COMPARATIVE EXAMPLE 8

The manufacturing process of Example 5 was modified in the following respects. The glass powder was changed to the finer powder (smaller than 50 μm in particle size) used in Example 1, and both the amount of the zircon powder and the content of Fe in the glass powder were increased as shown in Table 1. Moreover, the mixture of the glass powder and zircon powder was directly packed in the mold for firing without granulating the powder mixture.

COMPARATIVE EXAMPLE 9

The manufacturing process of Example 5 was modified in that the amount of the zircon powder was decreased as shown in Table 2 and that the glass powder (pulverized in the steel ball mill) was washed with acid to almost completely remove Fe from the glass powder. No complementary pigment was added.

TABLE 2

| | Glass Powder (refractive index 1.51:100 parts by wt.) particle size (μm) | Oxide kind (refractive index) | particle size (μm) | amount (part by wt.) | Pigment kind | amount (part by wt.) | Granulating Method | Mottling | Opaqueness | Denseness |
|---|---|---|---|---|---|---|---|---|---|---|
| Ex. 5 | ≦200 | zircon (1.97) | ≦10 | 5 | Fe | 0.05 | press & crush | A | A | A |
| Ex. 6 | " | zircon (1.97) | " | 0.2 | MnO₂ | 0.5 | " | A | A | A |
| Ex. 7 | " | cassiterite (1.99) | ≦50 | 5 | Fe₂O₃ | 0.5 | " | A | A | A |
| Ex. 8 | " | rutile (2.7) | ≦40 | 0.2 | FeSe | 0.01 | " | A | A | A |
| Ex. 9 | " | spinel (1.79) | ≦20 | 5 | Al₂O₃ / CoO | 0.1 | " | A | A | A |
| Ex. 10 | " | baddeleyite (2.2) | ≦20 | 2 | CuO | 0.05 | " | A | A | A |
| Comp. Ex. 6 | " | BaO (1.98) | ≦10 | 10 | Fe | 0.06 | " | B | A | C |
| Comp. Ex. 7 | " | feldspar (1.65) | ≦50 | 2 | Fe | 0.05 | " | B | C | A |
| Comp. Ex. 8 | ≦50 | zircon | ≦10 | 10 | Fe | 0.07 | not granulated | C | A | C |
| Comp. Ex. 9 | ≦200 | zircon | ≦10 | 0.2 | Fe | <0.01 | press & crush | C | A | A |

The sintered glass body of Example 6 using MnO₂ gave the appearance of a natural black rock having opaque and gray mottles. The sintered glass body of Example 7 using Fe₂O₃ gave the appearance of a natural red rock having opaque and reddish mottles.

In Comparative Example 6 the firing of the granulated material resulted in considerable foaming. The reason was the use of BaO which is a strongly basic and highly reactive substance. In Comparative Example 7 the sintered glass body was inferior in opalineness and retained some transparency. The reason was the use of feldspar having a refractive index not greatly different from the refractive index of the glass. In Comparative Example 8 where granulation of the powder mixture was omitted, the sintered glass body was too porous and was not appreciably mottled. In Comparative Example 9 where pigment was scarcely used, the sintered glass body surfaces were almost evenly opaline so that mottling was hardly perceptible.

What is claimed is:

1. A method of producing a substantially foamless sintered glass body with an opaquely mottled pattern, the method comprising the steps of:
   (a) preparing a mixture of 100 parts by weight of a powder of a glass, selected from the group consisting essentially of alkali lime glass, boro-silicate glass and aluminosilicate glass; 0.2 to 10 parts by weight of a powder of at least one heat-resistant inorganic oxide, which is colorless or assumes a whitish color and has a refractive index different from the refractive index of said glass by at least 15%, selected from the group consisting of aluminum oxide, zirconium oxide, titanium oxide, stannic oxide, zinc oxide, zircon and spinel; and an inorganic pigment, selected from the group consisting of metals, metal oxides and other kinds of metal salts and which differs in color from the inorganic oxide;
   (b) compressively granulating said mixture into granules not smaller than 1 mm in granule size;
   (c) mixing said granules;
   (d) firing the mixed granules at a temperature in the range from the softening point of said glass to the fluid point of said glass and applying a pressure to the fired material during or immediately after firing.

2. A method according to claim 1, wherein said powder of said glass is not larger than 200 μm in particle size.

3. A method according to claim 2, wherein said powder of said at least one heat-resistant inorganic oxide is not larger than 200 μm in particle size.

4. A method according to claim 1, wherein said mixture is divided into a plurality of portions before granulation, and said portions are granulated under differently compressive conditions to thereby obtain granules different in bulk density, the granules different in bulk density being mixed together before the mixing step.

5. The method of claim 1, further comprising the steps of preparing a second mixture as set forth in step a, wherein the pigment used in the second mixture differs in color from the pigment used in mixture of step a, thereby producing mottles of different colors.

6. The method of claim 1, further comprising the step of preparing another mixture as set forth in step a, wherein the amount of pigment used in the other mixture differs from the amount used in the mixture set forth in step a, thereby producing mottles of different colors.

7. A method of producing a substantially foamless sintered glass body with an opaquely mottled pattern, a method comprising the steps of:
   (a) preparing a mixture of 100 parts by weight of a powder of a colored glass containing an inorganic pigment, selected from the group consisting essentially of alkali lime glass, boro-silicate glass and aluminosilicate glass; and 0.2 to 10 parts by weight of a powder of at least one heat-resistant inorganic oxide, which is colorless or assumes a whitish color different from the color of said inorganic pigment and has a refractive index different from the refractive index of said glass by at 15%, selected from the group consisting essentially of aluminum oxide, zirconium oxide, titanium oxide, stannic oxide, zinc oxide and zircon and spinel;
(b) compressively granulating said mixture into granules not smaller that 1 mm in granule size;
(c) mixing said granules;
(d) firing the mixed granules at a temperature in the range from the softening point of said glass to the fluid point of said glass and applying a pressure to the fired material during or immediately after firing.

* * * * *